Nov. 1, 1949.  A. L. ROMAZON  2,486,496
CULINARY IMPLEMENT
Filed July 10, 1946
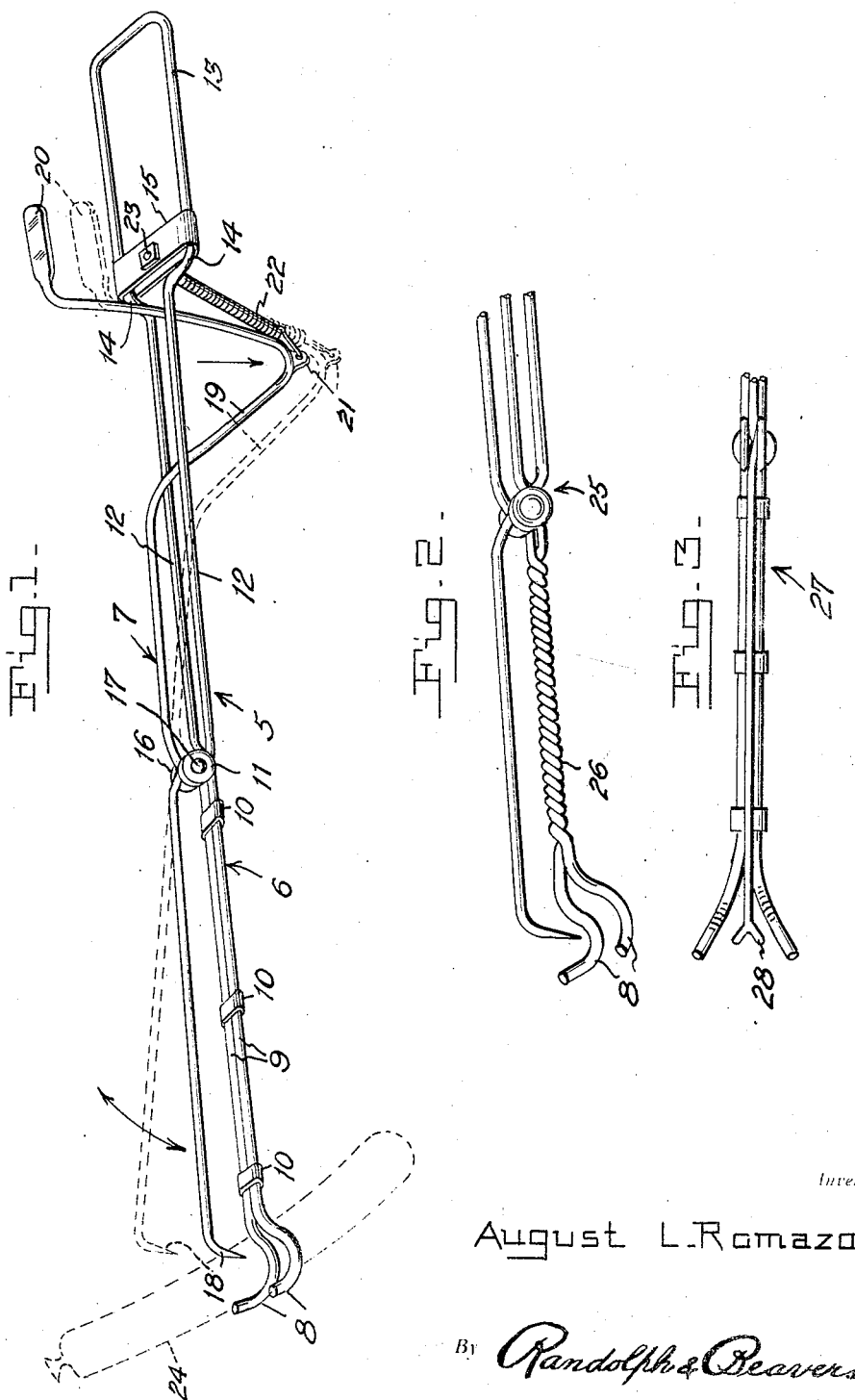
Inventor
August L. Romazon
By Randolph & Beavers
Attorneys Patented Nov. 1, 1949

2,486,496

UNITED STATES PATENT OFFICE 2,486,496

CULINARY IMPLEMENT

August L. Romazon, Rayville, Mo.

Application July 10, 1946, Serial No. 682,634

2 Claims. (Cl. 294—104)

This invention relates to a fork-like implement for use in cooking meat items or other food items capable of being roasted and is especially adapted for use in roasting over an open fire and is particularly intended for use in holding frankfurters for roasting in this manner.

A primary object of the invention is to provide an implement of the above described character capable of being readily maintained in a sanitary condition and which may be economically manufactured and which will be durable and efficient in operation for its intended purpose.

Still a further aim of the invention is to provide an implement for use in roasting food items having a jaw for piercing the item to be roasted and which effectively functions to prevent casual release of the food item.

Still a further aim of the invention is to provide an implement of the above described character equipped with spring means for effectively retaining the piercing jaw thereof in an operative position.

Still another aim of the invention is to provide an implement of such construction that it may be very effectively manufactured of heavy gauge wire.

Other objects and advantages of the invention will hereinafter become more fully apparent from the following description of the drawing, illustrating preferred embodiments thereof, and wherein:

Figure 1 is a perspective view of a preferred form of the culinary implement;

Figure 2 is a fragmentary perspective view of a slightly modified form thereof, and Figure 3 is a fragmentary top plan view of another modification of the culinary implement.

Referring more specifically to the drawing, and referring particularly to Figure 1, the culinary implement in its entirety is designated generally 5 and includes a fixed section, designated generally 6, and a pivoted section, designated generally 7.

The fixed section 6 preferably formed from an elongated strand of relatively heavy gauge wire which is bent double and the ends of which are correspondingly bent to arcuate form and disposed in outwardly diverging relationship to one another to form a fixed jaw 8 which opens upwardly. The strand portions 9, extending from the jaw 8, are disposed in abutting relationship and are secured together at spaced points by clamping collars 10. The strand portions 9 terminate, intermediate of the ends of the section 6 in upstanding loops 11 which merge into laterally spaced, corresponding shank portions 12 which are disposed in substantially the same plane as the portions 9 and substantially in alignment therewith. The shank portions 12 as seen in dotted lines in Figure 1, merge with the upstanding loops 11 on the outer sides of the shank portions 9 so that said loops 11 tend to space the shank portions 12 from one another. The strand of wire forming the section 6 is provided with an elongated, laterally enlarged intermediate portion forming a handle 13 which is provided with substantially parallel legs having converging inner ends 14 which merge with the adjacent ends of the shank portions 12.

A rigid clamp 15 is disposed transverse to the handle 13, adjacent the converging portions 14 and spans and is clamped to the parallel legs thereof for retaining said legs in properly spaced apart relationship, relatively to one another and for cooperating with the loops 11 for holding the shank portions 12 in spaced apart relationship, for a purpose which will hereinafter become apparent.

The implement section 7 is likewise formed from a single strand of wire which is bent to form a downwardly extending loop 16, intermediate of its ends and which is disposed between the loops 11 and pivotally connected thereto by a pivot pin 17 which extends through the eyes of the aligned loops 11 and 16, for pivotally supporting the implement section 7 on the implement section 6 and thereabove. One end of the wire strand forming the section 7 is turned downwardly and tapered to form a piercing jaw 18 which is disposed above and for movement toward and away from the jaw 8, as indicated in full and dotted lines in Figure 1. Between the loop 16 and the opposite end of the strand forming the section 7, said strand is provided with a downwardly extending, substantially V-shaped portion 19, the legs of which are disposed for swinging movement between the shank portions 12. The shank portions 12 are spaced sufficiently to permit free movement of the portion 19 therebetween, but sufficiently close to provide a guide for the swinging movement of the portion 19. The outer leg of the portion 19 terminates in an outturned, flattened and widened part 20, which forms the opposite terminal of said strand and which is disposed above the handle 13 to form a thumb rest, for a purpose which will hereinafter be described.

The substantially V-shaped portion 19 is provided with an outwardly projecting apertured extension 21 at the apex thereof which is connected to one end of a contractile coil spring 22, the opposite end of which is connected at 23 to the clamp 15.

From the foregoing it will be readily obvious that a frankfurter or other food article, as indicated in dotted lines in Figure 1 at 24 may be placed in the groove formed by the jaw 8 when the piercing jaw 18 is in its opened, dotted line position of Figure 1. The piercing jaw 18 is moved to an open position by a downward pressure on the thumb rest 20 for moving said thumb rest downwardly and toward the handle 13 and against the action of the contractile spring 22. After the food item 24 is thus disposed, the pressure on the thumb rest 20 is released, thus permitting the spring 22 to move the portion 19 upwardly to rock the section 7 on its pivot 17, thereby causing the piercing jaw 18 to be swung downwardly toward the jaw 8 for piercing the food item 24. The spring 22 retains the jaw 18 in its full line position of Figure 1, and in piercing engagement with the item 24 to effectively retain said item in engagement between the jaws 8 and 18. With the food item 24 thus held, the user by grasping the handle 13 may hold the jaw end of the implement 5 over a fire for roasting the food item 24 therein. After the food item has been sufficiently cooked, the implement 24 is removed from the fire and by placing the thumb of the hand grasping the handle 13 on the rest 20, said rest can be returned to its dotted line position to thereby move the piercing jaw 18 upwardly and out of engagement with the item 24, to permit said item to be slid or rolled from the jaw 8 by tilting or canting the implement 5.

A slightly modified form of the invention is disclosed in Figure 2 wherein the implement, designated generally 25 differs from the implement 5 only in that the lower section 26 thereof, instead of being provided with the shank portions 9 connected by the clamps 10, is provided with a portion 26, located between the jaws 8 and loops 11 thereof and formed by twisting the strand portions of the section 25, which are located between the parts 8 and 11. The implement 25 in all other respects is identical to the implement 5.

A portion of an implement, designated generally 27 and which constitutes a slight modification of the implement 5, is illustrated in Figure 3. The implement 27 differs from the implement 5 in that instead of being provided with a single-prong piercing jaw 18, the swingably mounted piercing jaw 28 of the implement 27 is bifurcated to form two laterally spaced downwardly extending piercing prongs. Otherwise, the implement 27 is identical in construction and operation to the implement 5.

Numerous other modifications and changes are likewise contemplated and may obviously be resorted to, without departing from the spirit and scope of the invention as hereinafter defined by the appended claims.

I claim:

1. In a culinary implement, a pair of elongated sections disposed in spaced apart, substantially parallel relationship, when in operative positions, said sections being pivotally connected intermediate of their ends and being provided with clamping jaws, adjacent corresponding ends thereof, one of said sections being provided with a handle portion at its opposite end, said other section having a lever portion at its opposite end terminating adjacent said handle portion and adapted to be manually moved toward the handle portion for opening the clamping jaws and the implement section, provided with said handle, having a longitudinally extending slotted guide portion, said other section having a downwardly offset portion in the lever part thereof slidably received in said slotted guide portion.

2. In a culinary implement, a pair of elongated sections disposed in spaced apart, substantially parallel relationship, when in operative positions, said sections being pivotally connected intermediate of their ends and being provided with clamping jaws, adjacent corresponding ends thereof, one of said sections being provided with a handle portion at its opposite end, said other section having a lever portion at its opposite end terminating adjacent said handle portion and adapted to be manually moved toward the handle portion for opening the clamping jaws, the section, provided with a handle, having a slotted guide portion adjacent thereto, said other section being provided with a downwardly offset portion in the lever part thereof slidably received in said guide portion, and a contractile spring connected at one end to said downwardly offset portion and at its opposite end to the handle for urging the jaws toward closed positions.

AUGUST L. ROMAZON.

REFERENCES CITED

The following references are of record in the file of this patent:

UNITED STATES PATENTS

| Number | Name | Date |
|---|---|---|
| 629,981 | Brann | Aug. 1, 1899 |
| 1,470,142 | Busch | Oct. 9, 1923 |
| 2,217,319 | Poole et al. | Oct. 8, 1940 |
| 2,286,708 | Bair | June 16, 1942 |